United States Patent [19]

Morduch et al.

[11] Patent Number: 5,125,023

[45] Date of Patent: Jun. 23, 1992

[54] SOFTWARE SWITCH FOR DIGITIZED AUDIO SIGNALS

[75] Inventors: Georg E. Morduch, Alexandria, Va.; J. Graham Hartwell, Germantown; Joe J. Lynn, Gaithersburg, both of Md.

[73] Assignee: Microlog Corporation, Germantown, Md.

[21] Appl. No.: 560,196

[22] Filed: Jul. 31, 1990

[51] Int. Cl.⁵ .............................................. H04M 1/65
[52] U.S. Cl. .................................... 379/88; 379/67; 379/84; 379/70
[58] Field of Search .............. 379/67, 88, 89, 56, 379/57, 84, 87, 97, 73, 70

[56] References Cited

U.S. PATENT DOCUMENTS

| 4,523,055 | 6/1985 | Hohl et al. | |
|---|---|---|---|
| 4,663,777 | 5/1987 | Szeto . | |
| 4,701,943 | 10/1987 | Davis et al. | |
| 4,716,583 | 12/1987 | Groner et al. | 379/88 |
| 4,763,350 | 8/1988 | Immendorfer et al. | 379/282 |
| 4,769,642 | 9/1988 | Davis et al. | |
| 4,790,003 | 12/1988 | Kepley et al. | |
| 4,811,379 | 3/1989 | Grandfield . | |
| 4,813,014 | 3/1989 | De Bell . | |
| 4,817,127 | 3/1989 | Chamberlin et al. | 379/67 |
| 4,837,807 | 6/1989 | Szeto et al. | 379/67 |
| 4,849,966 | 7/1989 | Willis et al. | |
| 4,853,952 | 8/1989 | Jachmann et al. | 379/88 |
| 4,908,850 | 3/1990 | Masson et al. | 379/88 |
| 4,922,520 | 5/1990 | Bernard et al. | 379/88 |
| 4,940,963 | 7/1990 | Gutman et al. | 379/57 |
| 4,942,598 | 7/1990 | Davis | 379/67 |
| 4,947,420 | 8/1990 | Stahl et al. | 379/57 |
| 4,975,945 | 12/1990 | Carbullido | 379/212 |
| 4,994,797 | 2/1991 | Breeden | 379/57 |
| 5,016,270 | 5/1991 | Katz | 379/93 |

FOREIGN PATENT DOCUMENTS 1397841  6/1975  United Kingdom ............... 379/213

OTHER PUBLICATIONS

"Conversant 1 Voice Systems: Architecture and Applications" R. J. Perdue et al., AT&T Tech Journal, vol. 65, No. 5, Sep./Oct. 1986 pp. 34,47.
"Talking & Listening to the Conversation 1 Voice System," S. A. Evans et al., AT&T Technology, vol. 3 No. 2, Mar./Apr. 1987, pp. 36–41.
"Turnkey 900 Service Bureaus", B. Kushnick, Inbound-/Outbound Magazine, Aug. 1989, pp. 46–48.
"IBM's Call Path Explained" B. Maikranz, Inbound-/Outbound Magazine, Oct. 1989, pp. 15, 16, 18.

Primary Examiner—Jin F. Ng
Assistant Examiner—Huyen D. Le
Attorney, Agent, or Firm—Dickinson, Wright Moon, Van Dusen & Freeman

[57] ABSTRACT

A method and apparatus are described for permitting conferencing in an automatic telephone information system by utilizing shared circular memory buffers incorporated in voice processing boards inserted in expansion slots in a PC to transfer speech from one line to another in a timed sequence controlled by the PC.

23 Claims, 5 Drawing Sheets

FIG. 9

SOFTWARE SWITCH FOR DIGITIZED AUDIO SIGNALS

FIELD OF THE INVENTION

This invention relates to automated telephone information systems, and in particular to an automated telephone information system wherein conferencing can be achieved with a minimum of equipment in addition to that required by the automated telephone information system itself. Conferencing is defined as connecting more than two parties to the system. An example is a "conversation" between recorded messages on the computer's hard disk, an operator and a caller with a rotary telephone set.

BACKGROUND OF THE INVENTION

In a basic automated telephone information system, a PC incorporating a number of voice processing boards with appropriate software is connected to a data base. The data base may be internal residing inside the PC in a truly basic system or it may be external being connected through a local area network (LAN). In one typical example, there are 48 telephone lines connected from the telephone company to the telephone information system. The PC associated with the system contains a mass storage device such as a hard disk containing digitized messages. The system communicates with a caller by transmitting analog messages through the appropriate channel of an associated voice processing board, after the digitized message has been converted to analog form. A caller communicates with the system by pushing tone buttons on the caller's telephone set.

The action to be taken in response to a caller's input is decided by the system with the aid of a set of instructions embodied in a software file called the Instruction Matrix which is unique to each application. In a typical example, a caller may be making inquiry of the Internal Revenue Service and after dialing the appropriate number on Touch Tone dial, (Touch Tone is a trademark of AT&T) receives a recorded message to push the numeral "1" if information is desired concerning a refund check. The caller would then push the "1" button on his hand set and receive in response a recorded message asking for entry of the caller's social security number. In response to the entry of the social security number, the computer would then institute a search of the data base (which might be remote from the automatic telephone information system) and play back a message based on the information uncovered in the search. Such a message might be: "the check is in the mail". The typical system just described requires that the caller have a touch tone telephone.

A problem arises when the caller does not have a Touch Tone telephone but is rather equipped with a rotary dial telephone. It is estimated that 25% of all telephones in the United States are of the rotary type.

In order to solve the problem of effectuating an automatic telephone information system for use with callers having rotary telephones, it has been proposed in the past that a private branch exchange (PBX) be inserted between the lines coming from the telephone company and the telephone information system. Operators are connected directly to the PBX. When a caller with a rotary dial places a call, he will be unable to respond with a tone response requested by the system. The system recognizes this lack of response as indicating a rotary dial caller. The Instruction Matrix will then conference the caller with an operator, through the PBX. The operator will be able to hear the responses of the caller, but generally will not be able to speak to the caller. The function of the operator in this instance is to translate a verbal response by the caller into a tone signal to the system, by the operator's physically actuating a Touch Tone pad. The telephone information system senses the tone input and reacts just as if the tones had emanated from the caller.

It is an object of the present invention to accomplish "conferencing" without the use of any substantial additional hardware, such as a PBX, beyond that included in the automated telephone information system itself.

SUMMARY OF THE INVENTION

In one preferred embodiment of the present invention, a resource such as an operator or speech recognition device, is permanently connected to one of the input ports of an automated telephone information system. Audio signals from a caller are digitized and buffered and the buffered data is moved to the buffer associated with the port to which the resource is connected. In a typical example, this data may be the social security number of the caller. The digitized data is converted to analog form and output to the resource, which in one preferred embodiment is a human operator. The invention enables the human operator to hear the spoken social security number and then physically actuate touch tone buttons to input the social security number to the computer in digitized form. The computer will then search its associated data base and output an appropriate message to the caller such as "your refund check is in the mail."

Other applications of the present invention are: 1) connecting an outside caller to a paging system, 2) assisting in the maintenance of the system by allowing a maintenance engineer to listen to both sides of the dialogue on any phone line, and 3) conventional half duplex conference calls.

DETAILED DESCRIPTION OF THE INVENTION

Figure 1:
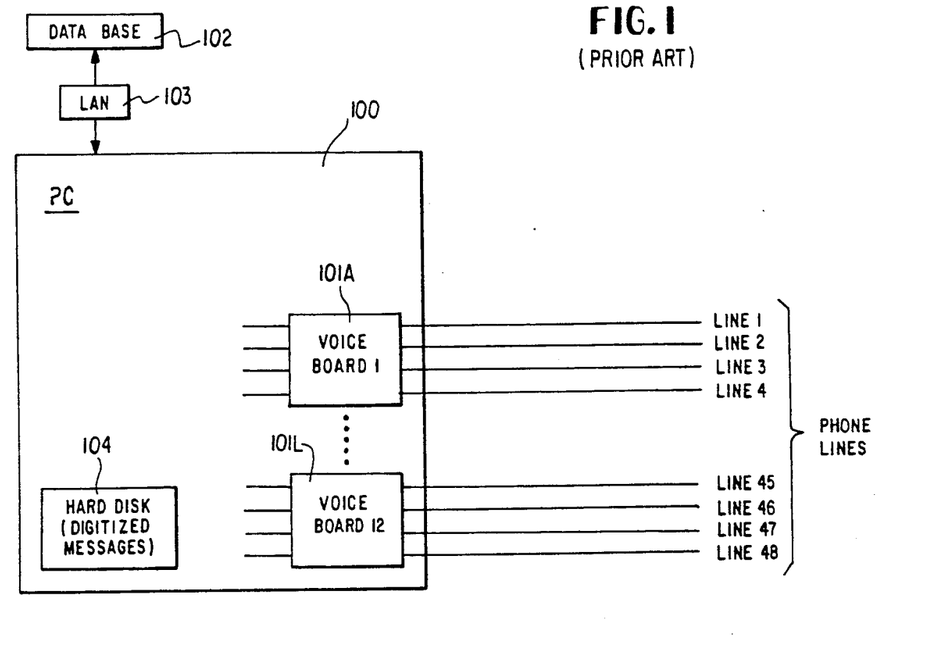
FIG. 1 is a block diagram of a typical prior art automatic telephone information system.

Referring now to FIG. 1, a basic prior art automatic telephone information system is illustrated. The basic system consists of a PC 100 containing a number of voice boards 101A through 101L. The PC 100 is preferably of the XT or AT class manufactured by International Business Machines Corporation. The voice boards 101A through 101L may be of the type manufactured by the Dialogic Corporation of Parsippany, N.J. under the trademark Dialog/4X. Each voice board occupies an expansion slot in the PC.

The PC is connected to a data base 102 through a local area network (LAN) 103 and in the example illustrated in FIG. 1, there are 48 telephone lines connected from the telephone company to the telephone information system. In the example illustrated, each of the voice boards 101A through 101L is capable of handling 4 phone lines. The PC contains a hard disk 104 containing a number of appropriate digitized messages. The system communicates with a caller by outputting digitized messages through the appropriate channel of the associated voice board 101A through 101L. As will be explained more fully below, each voice board contains an analog to digital and digital to analog converter as well as a shared memory buffer and a microprocessor.

A caller calls in to the system through one of telephone lines 1 through 48 by pushing tone buttons on the caller's telephone set. The action to take in response to a caller's input is decided by the system with the aid of a set of instructions residing in a software file unique to each particular application. The action might be as simple as processing one of the digitized messages from the hard disk. A more complicated action might be to request the caller to input his social security number by means of his tone buttons and then search the data base for the response. A message will then be played based on the information received from the data base. An example of such a message in the case previously mentioned involving the Internal Revenue Service might be "the refund check is in the mail". A drawback of the system illustrated in FIG. 1 is that it requires that the caller have a tone button telephone system.

Figure 2:
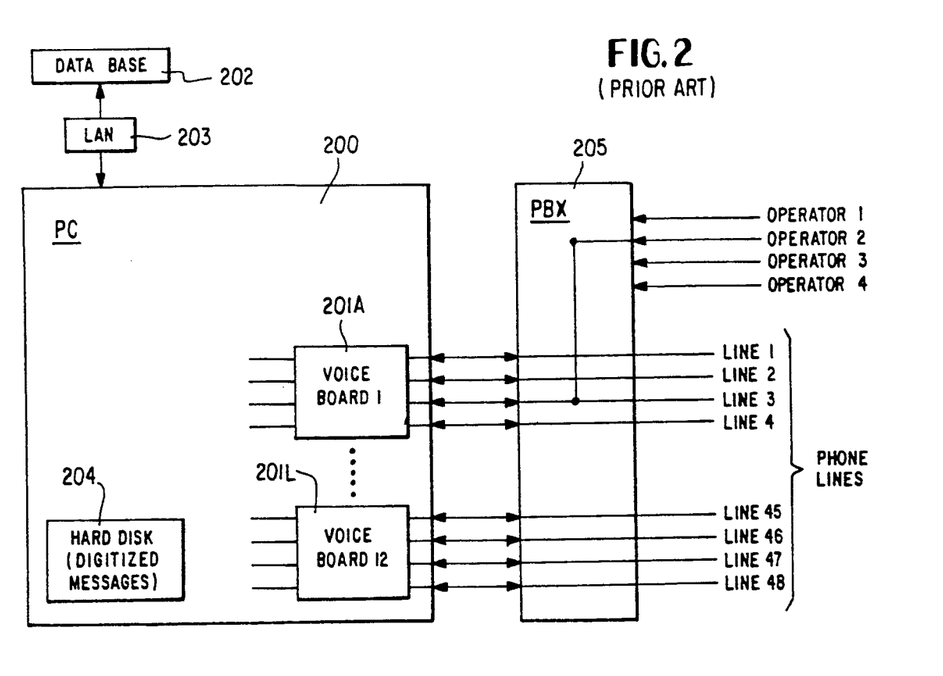
FIG. 2 illustrates a prior art system employing a private branch exchange (PBX) and human operators in an automatic telephone information system for communicating information between a caller equipped with a rotary dial telephone and the system.

Referring now to FIG. 2, a prior art solution to the accommodation of callers having rotary dial telephones, is illustrated. The system set forth in FIG. 2 includes the same basic components as that in FIG. 1, except for the addition of a private branch exchange (PBX) 205. Thus, the system of FIG. 2 includes a PC 200, voice boards 201A through 201L, data base 202, LAN 203 and hard disk 204. In addition, the same 48 telephone lines are illustrated, 4 of which are associated with each voice board 201A through 201L. Four human operators are connected directly to the PBX.

The system recognizes a caller with a rotary telephone by the lack of a tone response to a prompt that requests a tone response, such as "if you desire information about your income tax refund, please press numeral 1 on your Touch Tone phone". Subsequent action by the system is specified in the software file instructions which in this instance commands the system to initiate a conference call to an operator.

When the operator answers, the caller, the operator and the telephone information system will be in conference. In FIG. 2, as an example, phone line 3 is conferenced with operator 2. From this point on, the action of the system is substantially identical to that for callers with tone phones, the only difference residing in the nature of the prompts given by the system. Rather than the system asking the caller to push buttons on his tone phone, the caller will be asked to speak numbers aloud. Since an operator is now conferenced with the caller, when the operator hears the number spoken, he will push the appropriate button on the operator phone pad. The only action taken by the operator is to answer the phone, listen to the information spoken by the caller and push buttons on the phone pad. The operator never speaks to the caller and in many systems is not provided with a mouthpiece. The telephone information system senses the tone input and reacts just as if tones had emanated from the caller.

In the system of FIG. 2, the software instruction file has as one of its many inputs, a schedule of the operator's working hours. This causes the system to prevent operators from being called after hours or on a day when the business with which the telephone information system is associated, is closed.

In order to initiate a conference call in the system of FIG. 2, a series of tone codes, including the operator extension must be sent to the PBX. The actual code depends on the particular PBX employed and must be specified in the file instructions. The tones are sent through the voice processing board on command from the PC. The voice processing board monitors the line and returns to the PC a code indicative of the outcome of the call to the operator, i.e. answered, busy or no answer. The call outcome is another input to the software file instructions which must be set up to queue calls for operator assistance in cases where all operators are busy.

Figure 4:
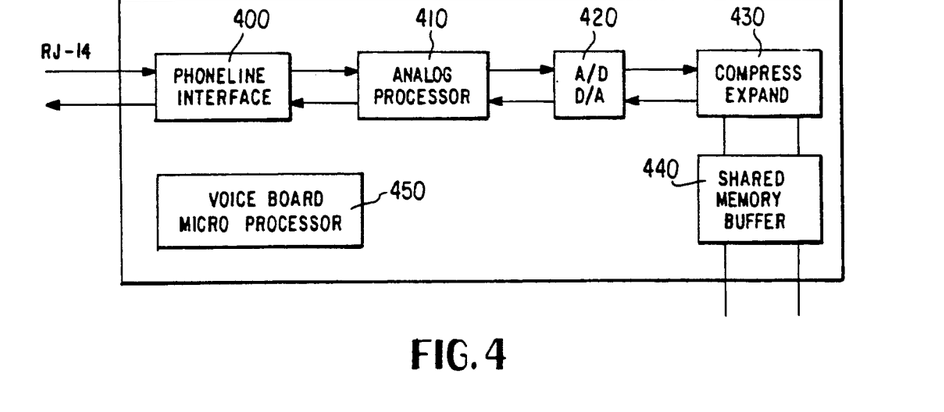
FIG. 4 illustrates the signal path of data through a typical voice board.

The signal path of data through a voice board is shown in FIG. 4. As shown in FIG. 4, a telephone line is connected to the phone line interface 400 through a standard RJ-14 connector. An incoming audio signal undergoes analog processing in analog processor 410 and is then digitized in analog to digital and digital to analog converter 420. In a preferred embodiment, the digitization rate is 6,053 Hz and the sample size is one byte (8 binary bits). The digitized data is compressed through adaptive differential pulse code modulator (ADPCM) 430 to one half its sample size. Thus, 6,053 bytes of data enter modulator 430 every second, but only 3,026 bytes leave the modulator in the same time period. Data emanating from the modulator 430 is stored in a 1024 byte circular buffer 440. Circular Shared Memory Buffer 440 is in RAM (random access memory), and is shared between the PC and the voice board. A Circular Buffer is made up of a single continuous memory block. The first entry into the buffer is put in the lowest memory location of the buffer. Subsequent entries are put in sequential memory locations. After the last memory location of the buffer has been filled, the next entry is put in the lowest memory location. The first entry is over-written at that point. The program is designed so that the first entry is processed prior to this happening.

An outgoing voice signal undergoes the process in reverse to that of an incoming signal. The PC places compressed voice data in the circular buffer 440 from where it is picked up at the rate of 3,026 bytes per second in modulator 430 and expanded to 6,053 bytes per second by a process which is the reverse of ADPCM. Digital to analog convertor 420 places the signal into analog form and the signal undergoes some smoothing in processor 410 before being output as an audio signal through phone line interface 400.

The voice board runs under the control of microprocessor 450. Micro-processor 450 informs the PC when to collect data from the shared circular memory buffer 440. The microprocessor accomplishes this task in two ways. First, it induces a hardware interrupt in the PC and second, it inserts coded instructions in the Voice Board to PC Command Buffer 541. The purpose of the hardware interrupt is to force the PC to interrupt its current task and make it examine the command buffer 541. The micro code on the Dialog/4X B voice board supports thirteen different commands. The first half 544 of the circular buffer 440 is referred to as BUF0 and the second half 545 as BUF1 in FIG. 5. One of the thirteen voice board commands tells the PC that BUF0 is full and another tells it that BUF1 is full. The other commands are not relevant to the present invention. Each of BUF0 544 and BUF1 545 contains data corresponding to about 0.17 seconds of audio information. At the end of the recording, the last buffer in general is not full. The number of usable bytes in the last buffer is passed to the PC through the Buffer Information Block 543.

Figure 5:
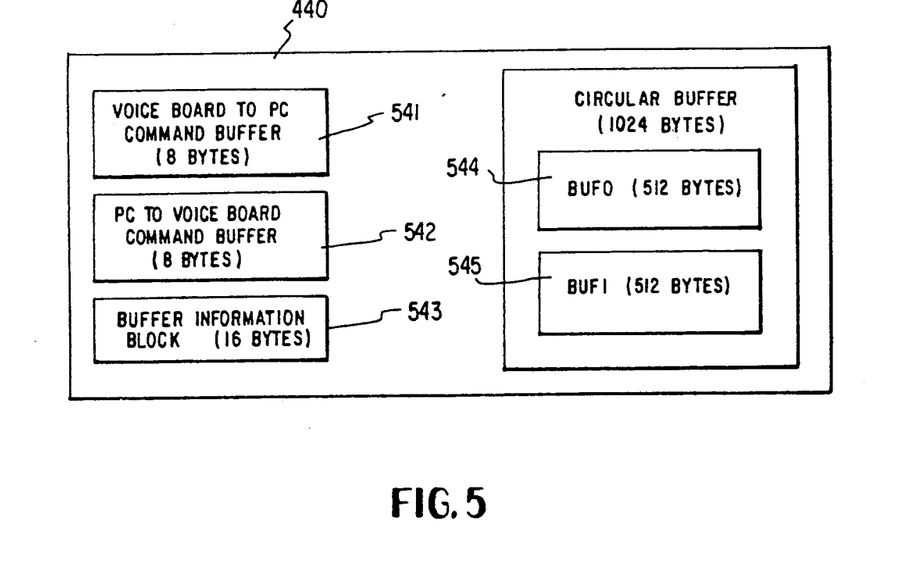
FIG. 5 is an expanded view in block diagram form of the shared memory buffer of the typical voice board of FIG. 4.

The PC communicates commands to the voice board in a manner which is very similar to that used by the voice board to communicate with the PC. The PC does this in two ways. First it induces a hardware interrupt on the voice board and second, it inserts coded instructions in the PC to Voice Board command buffer 542. The purpose of the interrupt is to force the voice board microprocessor 450 to interrupt its current task and make it examine the command buffer. One of the PC commands tells the voice board to start recording and another to start playback. The loading of the buffers BUF0 544 and BUF1 545 is controlled from the voice board through commands telling the PC that either BUF0 or BUF1 is empty.

Figure 3:
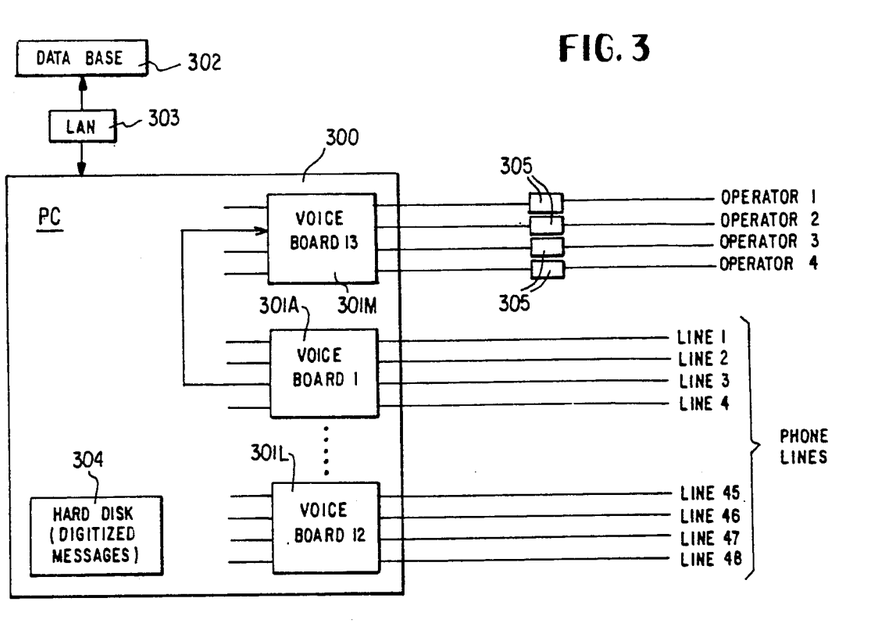
FIG. 3 shows the application of the invention to an automatic telephone information system which permits communication between a caller equipped with a rotary dial telephone and the system, without use of a PBX.

Referring now to FIG. 3, the application of the invention to communicating between a caller with a rotary dial telephone and an automatic telephone information system, is illustrated. The system illustrated in FIG. 3 is similar to that shown in FIG. 2 except that the PBX of FIG. 2 is replaced by an additional voice board 301M in the PC. Thus, the system of FIG. 3 includes PC 300 having voice boards 301A through 301M, data base 302, LAN 303 and hard disk 304 containing digitized messages. The thirteenth voice board 301M is connected locally to the 4 operators through audio interface units 305. The operators call into the system as soon as they are available to give assistance to rotary callers. They do not hang up until they leave their post. Rotary callers are identified in the same manner as set forth in the description of the system of FIG. 2, i.e., a non-response to a command for entering information via tone buttons. The software instruction file will then initiate the action of the software switch of the present invention and connect the caller (on line 3 in the illustrated example) with an operator (operator 2 in the illustrated example) so that the operator can hear the spoken words of the caller and enter the appropriate Touch Tone responses to the system.

Figure 6:
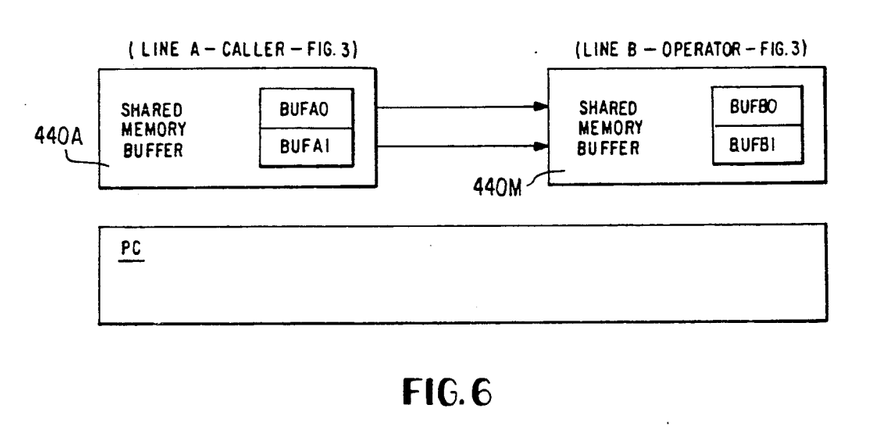
FIG. 6 illustrates in schematic form how the input on one line is coupled to the output of another line.
Figure 7:
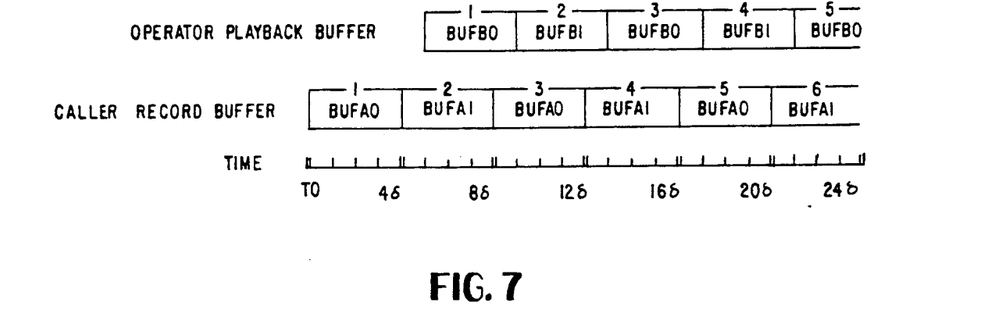
FIG. 7 illustrates the record and playback buffers associated with the two lines shown in FIG. 6 as a function of time.

Referring now to FIGS. 6 and 7, the manner in which the input from phone line 3 in FIG. 3 is coupled to the output of operator 2 is illustrated. In FIGS. 6 and 7, the caller on line 3 is designated as "A" and operator 2 is designated as line "B".

Referring to FIG. 7, $\delta$ is the time it takes to record 128 bytes. The time taken to fill a full 512 byte buffer is therefore 4 $\delta$ and at a data rate of 3,026 bytes per second, this equals about 0.17 seconds. The number at the top of each rectangle depicting a buffer serves to identify the buffer contents. If the number is the same, then so are the contents. Thus, the content of the operator playback buffer between t0+5 $\delta$ and t0+9 $\delta$ (BUFB0 "1") is identical to that of the record buffer between t0 and t0+4 $\delta$ (BUFA0 "1"). The following is a step-by-step description of switching of audio signals from one channel to another:

| | |
|---|---|
| Time: | t0. |
| Step 1. | PC commands the voice board associated with the caller on Line 3 (voice board 1 in FIG. 3) to start recording. |
| Time: | t0 + 4$\delta$. |
| Step 2. | BUFA0 is full, voice board 1 signals PC: BUFA0 FULL. |
| Step 3. | PC moves contents of BUFA0 to BUFB0. |
| Step 4. | PC initiates a time delay of $\delta$. |
| Time: | t0 + 5$\delta$. |
| Step 5. | PC commands operator voice board (Line B) to start playback. |
| Time: | t0 + 8$\delta$. |
| Step 6. | BUFA1 is full, voice board signals PC: BUFA1 FULL. |
| Step 7. | PC moves contents of BUFA1 to BUFB1. |
| Time: | t0 + 12$\delta$. |
| Step 8. | BUFA0 is full, voice board signals PC: BUFA0 FULL. |
| Step 9. | PC moves contents of BUFA0 to BUFB0. |

Steps 6 through 9 repeat indefinitely until all recorded data is played back to operator. Once the playback operation is initiated in Step 5, it continues until the contents of the last buffer containing data is played back.

The invention thus achieves the transfer of audio data from one phone line to another in a half-duplex manner, i.e., the transfer of the audio can take place in one direction at a time. The transfer is not full duplex because the digital analog/analog to digital processor 420 (FIG. 4) is half-duplex. There is approximately a 0.21 second of delay (the time taken to fill a buffer and a quarter) in the transfer. Theoretically, the delay could be cut by one fifth by starting the playback immediately after the first buffer has been recorded. It should, however, be realized that the voice board microprocessors perform many tasks and there is no guarantee that the time between data requests from the voice board to the PC on any one channel, is going to be constant. (If it were possible to instruct the voice board to implement commands after a specified time interval, then a delay of one buffer's worth of data plus the specified time interval would be very easy to implement). The delay in most cases however, is of little importance.

By utilizing the shared memory buffers of two lines under command of the PC, it can be seen that the present invention eliminates the need for a PBX (or other hardware switch) in order to achieve conferencing between two callers (a caller and an operator) and the system.

Figure 8:
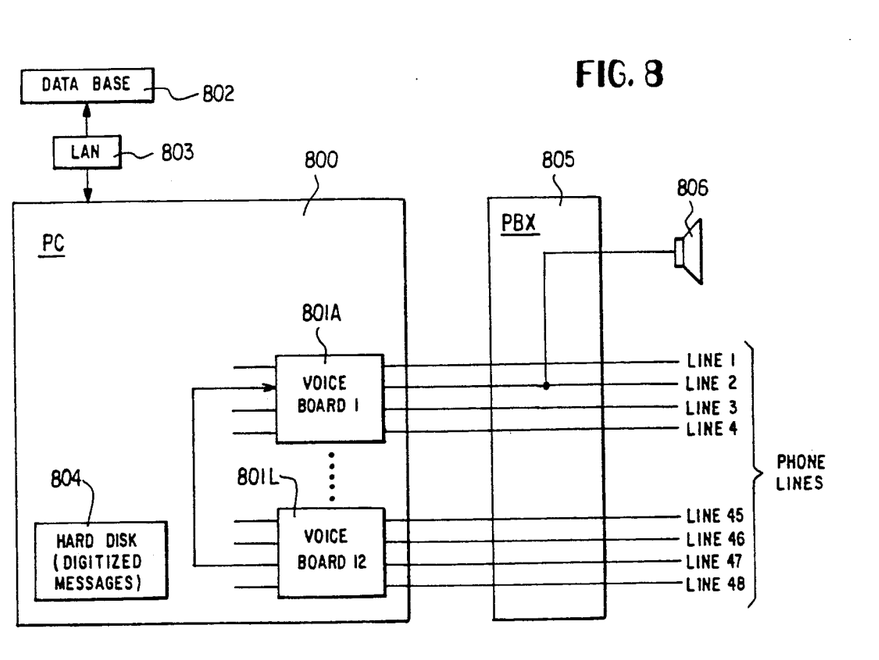
FIG. 8 illustrates in block diagram form the application of the invention to connecting an outside caller to a paging system.

Referring now to FIG. 8, an illustration is provided of a further application of the present invention, i.e., connecting an outside caller to a paging system in an automatic telephone information system employing a PBX. The illustrated example includes, as in FIG. 2, a PC 800, containing voice boards 801A through 801L, data base 802, LAN 803, a hard disk 804 containing digitized messages, a PBX 805 and a paging system 806 as well as 48 phone lines associated in groups of four with voice boards 1 through 12. Most PBX's do not allow calls to be transferred to its paging system, i.e., a system of loud speakers spread throughout the particular building containing the system. In the example shown in FIG. 8, an incoming caller on line 47 indicates through an appropriate code, e.g., through tones generated by a tone generating telephone set, to the PC that he would like to be transferred to the paging system. The PC finds an unused line, e.g., line 2, takes it off hook and dials the extension of the paging system. After a predetermined time delay, the sequence illustrated in FIGS. 6 and 7 takes place and digitized speech input from line 47 is transferred to be output on line 2 and thence to the paging system 806.

A further application of the invention occurs in a situation where a maintenance engineer desires to monitor the operation of the system. With reference to the system shown in FIG. 3 for example, the maintenance engineer might call in on telephone line 3. He would be equipped with a tone generating telephone set and would push appropriate tone digits which would take him through a secret path of the PC program. He might then indicate that he wishes to monitor the activity on line 47 for example. The PC would then activate the sequence set forth in FIGS. 6 and 7 to take place between lines 47 and 2. Line 2 is set to play digitized data to the caller. If line 47 is listening to the PC, then line 2 would get exactly the same data to listen to as line 47 and if line 47 is recording information, then the recorded digitized data is transferred to line 2. In other words, line 2 will hear both sides of the dialogue on line 47 and thus be able to monitor the operation of the system.

Figure 9:
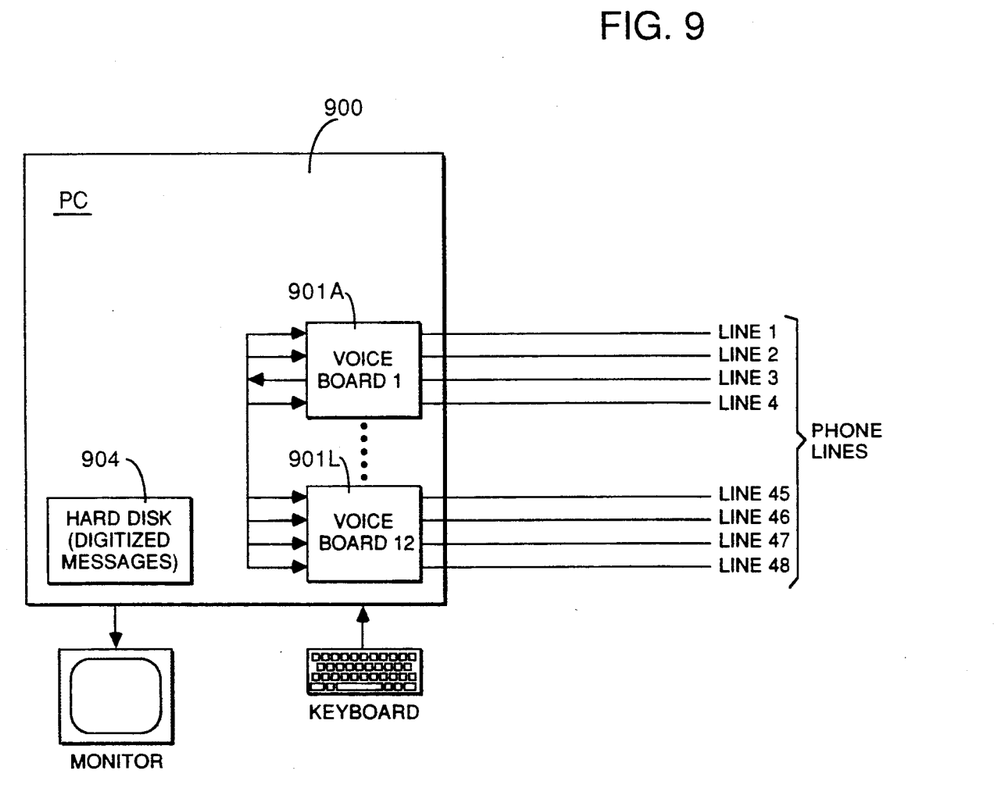
FIG. 9 illustrates in block diagram form the application of the invention to a multi-caller conference call controlled by a moderator who allows only one caller to speak at a time.

Referring now to FIG. 9, a further application of the invention is illustrated in block diagram form, for the situation where a multi-caller conference is controlled by a moderator who allows only one caller to speak at a time. The system in most respects is similar to that illustrated in FIG. 3, except that it additionally includes PC monitor console 905 and keyboard 906. Like FIG. 3, it also includes PC 900 containing voice boards 901A through 901L inserted in expansion slots in the PC and hard disk 904 within the PC. Telephone lines 1 through 48 are also employed.

The application is similar to that for operator assisted calls in FIG. 3. Callers wishing to speak notify the moderator that they want to speak by pushing buttons on their tone phone pads. The names of all speakers are encoded on the PC's hard disk 904 in digitized voice form. Thus, a caller will identify himself by pushing the particular buttons corresponding to his identification code.

The moderator sits in front of PC console 905 which will display the individual requests on monitor screen 905. The moderator will then select any particular speaker, including himself, through the PC keyboard 906 by typing in the particular code corresponding to that speaker. Once the selection is made, each conference participant will hear a prerecorded message from hard disk 904 announcing the next speaker.

After the announcement of the speaker is made, the selected speaker is handled like a caller in the operator assisted mode described with respect to FIG. 3. In this case, however, the digitized speech instead of being redirected to a single operator, is redirected to all participants in the conference call. In the example illustrated in FIG. 9, the conference participant on line 3 is the selected speaker.

In the method of conferencing, just described, all speech transmission is half duplex, whereas in conventional conferencing speech transmission if full duplex, which allows anybody to speak at any time. The advantage of the system just described is that the chaotic situation created by a large number of speakers in a full duplex conference is avoided, since the moderator is in total charge of the conference.

It will be apparent to those with skill in the art that further and other applications and variations may be made without departing from the spirit and scope of the invention as set forth in the appended claims.

We claim:

1. In an automated telephone system including at least two telephone lines and a computer, each of said telephone lines being associated with voice processing means comprising record and playback means controlled by the computer for recording and reproducing signals the method of transferring a voice message comprising the steps of:

(a) connecting said voice processing means associated with a first of said telephone lines with said computer;
    (b) connecting said voice processing means associated with a second of said telephone liens with said computer;
    (c) recording signals representative of speech of a party on said first line on the record means of said voice processing means associated with the first line;
    (d) transferring said recorded signals under the control of said computer to the record means of said voice processing means associated with a second of said at least two lines; and
    (e) activating said voice processing means associated with said second line to reproduce said signals representative of speech of said party on said first line under the control of said computer to said second line.

2. The method of claim 1 including the further steps of:

(a) converting the signals representative of speech on the first line to first digital signals prior to said step of recording; and
    (b) converting said first digital signals to analog form to reproduce said signals.

3. The method of claim 2 wherein said second of said telephone lines is connected to a tone generator and including the step of:

(a) actuating the tone generator connected to said second line to generate coded tone signals corresponding to a selected portion of the analog speech reproduced on the second line.

4. The method according to claim 3 wherein said tone generator is actuated by a human operator.

5. The method according to claim 3 wherein said tone generator is actuated by a speech recognition device.

6. The method according to claim 1 wherein each of said voice processing means record and playback means includes a buffer having first and second portions and further including the steps of:

(a) recording first signals representative of speech of a party on said first line in a first portion of the buffer of the voice processing means associated with said first line;
    (b) transferring said first signals from said first portion of the buffer of the voice processing means associated with said first line to a first portion of the buffer of the voice processing means associated with said second line;

(c) reproducing said first signals representative of speech of said party on said first line from said first portion of the buffer of the voice processing means associated with said second line;

(d) recording second signals representative of speech of a party on said first line in a second portion of the buffer of the voice processing means associated with the first line;

(e) transferring said second signals from said second portion of the buffer of the voice processing means associated with said first line to a second portion of the voice processing means of the buffer associated with the second line;

(f) reproducing said second signals representative of speech of said party on said first line from said second portion of the buffer of the voice processing means associated with said second line; and (g) repeating the foregoing steps until all signals representative of speech on the first line are reproduced on the second line.

7. In an automated telephone system of claim 6 further including a paging system, the method further comprising the steps of:

(a) detecting a coded signal of the first line;

(b) connecting said second line to the paging system in response to the detection of said coded signal; and (c) effectuating the sequence of steps set forth in subparagraphs (c), (d) and (e) of claim 1.

8. The method according to claim 6 wherein said step of recording comprises converting analog signals to digital signals and said step of reproducing comprises converting digital signals to analog signals.

9. In an automated telephone system of claim 1 further including a paging system, the method further comprising the steps of:

(a) detecting a coded signal on the first line;

(b) connecting said second line to the paging system in response to the detection of said coded signal; and (c) effectuating the sequence of steps set forth in subparagraphs (c), (d) and (e) of claim 1.

10. The method of claim 1 wherein said party on said first line is a caller to the system and the party on the second line is monitoring the operation of the system.

11. The method according to claim 1 wherein said step of activating commences only after all of said recorded signals have been transferred to the record means of said voice processing means associated with a second of said at least two lines.

12. In an automated telephone system including at least two telephone lines and a computer, each of said telephone lines being associated with voice processing means comprising record and playback means controlled by the computer for recording and reproducing signals, means of transferring voice message comprising:

(a) means for connecting said voice processing means associated with a first of said lines with said computer;

(b) means for connecting said voice processing means associated with a second of said lines with said computer;

(c) means for recording signals representative of the speech of a party on said first line on the record means of said voice processing means associated with the first line;

(d) means for transferring said recorded signals to the record means of said voice processing means associated with at least a second of said lines; and (e) means for reproducing said signals representative of speech of a party on said first line to at least said second line.

13. The telephone system of claim 12 wherein said voice processing means comprises voice processing boards and said record and playback means comprise shared memory buffers.

14. The telephone system of claim 13 wherein said buffers are circular buffers.

15. The telephone system of claim 14 wherein said shared memory buffers comprise first and second sections and further including:

(a) means for recording signals representative of speech on said first line in a first section of said first shared memory buffer;

(b) means for transferring said signals representative of speech to a first section of said second shared memory buffer after said first section of said first buffer is filled; and (c) means for continuously reproducing on said second line signals representative of said speech on said first line and from said first section of said second shared memory buffer.

16. The telephone system of claim 15 further including:

(a) means for recording signals representative of speech on said first line in a second section of said first memory buffer after said first section of said first memory buffer is full; and (b) means for transferring said signals representative of speech from said second section of said first memory buffer to said second section of said second memory buffer.

17. The telephone system of claim 16 further including means for ensuring that all of said signals representative of speech have been transferred to said first section of said second shared memory buffer prior to commencing reproduction on said second line of said signals representative of speech.

18. The telephone system of claim 12 further including:

(a) storage means associated with said computer having at least two identification codes stored therein, each of said identification codes identifying a respective one of said telephone lines and (b) means responsive to said identification codes for selecting said first of said lines and said second of said lines.

19. The telephone system of claim 18 wherein said at least two identification codes comprise more than two identification codes.

20. The telephone system of claim 19 wherein said means for selecting comprises monitor means for displaying the identification codes of said at least two identification codes and said responsive means comprises input means to said computer.

21. The telephone system of claim 20 wherein said input means comprises keyboard means.

22. The telephone system of claim 21 wherein said display means and keyboard means are capable of being monitored by a human moderator.

23. In an automated telephone system including at least two telephone lines, a computer having associated storage means, display means and input means; voice processing means having record and playback means associated with each telephone line and controlled by the computer, the method of controlling a multi-caller conversation through a moderator, comprising the steps of:

(a) assigning a coded tone designation to each caller on said at least two telephone lines;
(b) recording each coded tone designation on said computer storage means;
(c) activating tones on a tone pad located at each telephone line in accordance with the coded tones designating the caller on that line;
(d) displaying the identification of the caller associated with each coded tone designation on said computer display means;
(e) selecting at least one of said callers by inputting the coded designation associated with said selected at least one caller to said computer through said computer input means;
(f) recording signals representative of speech of said selected caller on the record means associated with the selected caller's telephone line;
(g) transferring said signals representative of said speech under the control of said computer to the record means associated with each of the other of said at least two lines having a caller thereon; and
(h) reproducing said signals representative of said speech under the control of said computer on the lines associated with the parties on each of the other telephone lines.

* * * * *